United States Patent
Hildebran et al.

(10) Patent No.: US 7,054,399 B1
(45) Date of Patent: May 30, 2006

(54) LOW OVERHEAD SYNCHRONIZED ACTIVATION OF FUNCTIONAL MODULES

(75) Inventors: Bret S. Hildebran, Chagrin Falls, OH (US); Thomas K. Sugimoto, Twinsburg, OH (US); Terence Scott Tenorio, Solon, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 1006 days.

(21) Appl. No.: 09/675,928

(22) Filed: Sep. 29, 2000

(51) Int. Cl.
*H04L 7/00* (2006.01)
*H04B 17/00* (2006.01)
*H04Q 1/20* (2006.01)

(52) U.S. Cl. .................................................. 375/355
(58) Field of Classification Search ............ 375/224, 375/226, 354, 355, 356, 357, 371; 370/222, 370/503, 516; 709/208
See application file for complete search history.

(56) References Cited

U.S. PATENT DOCUMENTS

| | | | |
|---|---|---|---|
| 4,677,614 A * | 6/1987 | Circo | 370/222 |
| 5,068,877 A * | 11/1991 | Near et al. | 375/356 |
| 5,519,726 A * | 5/1996 | DiCarlo | 375/224 |
| 5,550,873 A | 8/1996 | Dolev et al. | 375/354 |
| 5,636,124 A | 6/1997 | Rischar et al. | 700/100 |
| 5,887,029 A | 3/1999 | Husted et al. | 375/224 |
| 5,903,607 A | 5/1999 | Tailliet | 375/257 |
| 5,933,454 A | 8/1999 | Cioffi | 375/260 |
| 6,202,085 B1 * | 3/2001 | Benson et al. | 709/205 |
| 6,745,232 B1 * | 6/2004 | Blech et al. | 709/208 |

FOREIGN PATENT DOCUMENTS

EP    385134 A  *  9/1990

OTHER PUBLICATIONS

Allen-Bradley Co., Inc. Product Specification Updated Jun. 9, 1999, pp. 1-24.

* cited by examiner

*Primary Examiner*—Kevin Kim
(74) *Attorney, Agent, or Firm*—Amin & Turocy, LLP; R. Scott Speroff

(57) ABSTRACT

A system and/or method for synchronizing one or more modules of an industrial controller relative to a common time base. A module may be programmed and/or configured to employ an activation interval for controlling periodic activation for sampling one or more inputs and/or applying data at outputs of the module. The module synchronizes its activation interval based on a coordinated time base signal.

24 Claims, 6 Drawing Sheets

LOW OVERHEAD SYNCHRONIZED ACTIVATION OF FUNCTIONAL MODULES

TECHNICAL FIELD

The present invention relates to the art of industrial controllers, and more particularly, to a system and method for synchronizing input sampling and/or output application of multiple modules.

BACKGROUND OF THE INVENTION

Industrial controllers are special purpose computers used for controlling industrial processes, manufacturing equipment, and other factory automation. In accordance with a control program, the industrial controller measures one or more process variables or inputs reflecting the status of a controlled process, and may change outputs affecting control of the process. The inputs and outputs may be binary, (e.g., ON or OFF), as well as analog inputs and outputs assuming a continuous range of values. The control program may be executed in a series of execution cycles with batch processing capabilities.

An industrial controller may be customized to a particular process by writing control software that may be stored in the controller's memory and/or by changing the hardware configuration of the controller to match the control task. Separating the industrial controller into a number of control modules, each of which performs a different function, facilitates controller hardware configuration. Particular control modules needed for the control task may then be connected together on a common backplane within a rack. The control modules may include processors, power supplies, network communication modules, and I/O modules exchanging input and output signals directly with the controlled process. Data may be exchanged between modules using a backplane communications bus, which may be serial or parallel. A typical hardware modification may involve adding additional I/O modules so as to be able to monitor and/or control additional equipment.

Various control modules of the industrial controller may be spatially distributed along a common communication link in several racks. Certain I/O modules may thus be located in close proximity to a portion of the control equipment, and away from the remainder of the controller. Data is communicated with these remote modules over a common communication link, or network, wherein all modules on the network communicate using a standard communications protocol.

Precise coordination of actions between separated functional modules of a large industrial controller is complicated. One particularly demanding application is the synchronized measurement and/or control of electrical waveforms at spatially separate points, such as associated with motor control or to characterize electrical power. Here, control resolution on the order of a few microseconds is desirable. Yet even with high speed communication links, the time required to arbitrate for control of the communication link for transmission of a coordinating message, and the time required to translate a message between the different communication links that may separate the modules, via one or more bridges, may exceed the desired precision.

For example, U.S. Pat. No. 5,887,029 discloses the use of a coordinated system time for synchronizing messages communicated over a communications link between modules. The coordinated actions are implemented based on a time conditional command that is received by each component (or control module) that is to execute the command prior to a selected execution time. The coordinated system time further may be employed to time stamp triggering events for use in coordinating subsequent actions based on the triggering events.

While U.S. Pat. No. 5,887,029 discloses an approach that facilitates coordination of triggering events, such coordination is based on additional overhead at the controller for initiating the command message for initiating the time coordinated event. The additional overhead may be undesirable in certain circumstances, such as when continued synchronized measurements of process characteristics with multiple modules may be desired. As a result, an improved system and method for synchronizing sampling events or applications of outputs at one or more of functional modules is desired.

SUMMARY OF THE INVENTION

The present invention relates to a system and/or method for synchronizing one or more modules of an industrial controller to synchronize sampling of inputs and/or application of outputs with respect to a common time base. Each module may be programmed and/or configured to operate in a mode in which it employs a sampling interval to initiate periodic sampling. Each module synchronizes the sampling interval thereof based on a coordinated system time base signal received via a backplane or network. As a result, each module periodically samples its inputs in synchronicity with the common time base. Moreover, by setting the sampling interval of each module to the same or a proportional value, each module may periodically sample its associated inputs and, in turn, process variables at substantially the same time. Advantageously, little or no additional overhead is needed to implement synchronization in accordance with the present invention. Synchronization is performed relative to a multiple of a time-base zero.

Another aspect of the present invention provides a system for synchronizing a sampling interval at an industrial control module. The system includes a time master for providing to a backplane and/or network a coordinated system time base signal having a value. A module is operatively connected to the backplane. The module has a sampling interval for controlling periodic sampling of at least one input thereof. The module is configured to synchronize the sampling interval thereof relative to the coordinated system time base value.

Yet another aspect of the present invention provides a module for use in an industrial controller system. The module includes a communications link for receiving a coordinated system time base signal and a field side connection to sample input data and/or apply output data. The module is programmed to control activation of the field side input or output based on an activation interval value. The module synchronizes activation of the field side as a function of the coordinated system time base signal.

Another aspect of the present invention provides a method for synchronizing sampling of a module relative to common time base. The module has a sampling interval for controlling periodic sampling of at least one input thereof. A coordinated system time base signal having a value is received over a backplane/network and the sampling interval of the module is synchronized relative to the coordinated system time base value. In accordance with an aspect, the same philosophy for synchronizing input sampling may be applied to applying output signals.

To the accomplishment of the foregoing and related ends, certain illustrative aspects of the invention are described herein in connection with the following description and the annexed drawings. These aspects are indicative, however, of but a few of the various ways in which the principles of the invention may be employed and the present invention is intended to include all such aspects and their equivalents. Other advantages and novel features of the invention will become apparent from the following detailed description of the invention when considered in conjunction with the drawings.

DETAILED DESCRIPTION OF THE INVENTION

Figure 1:
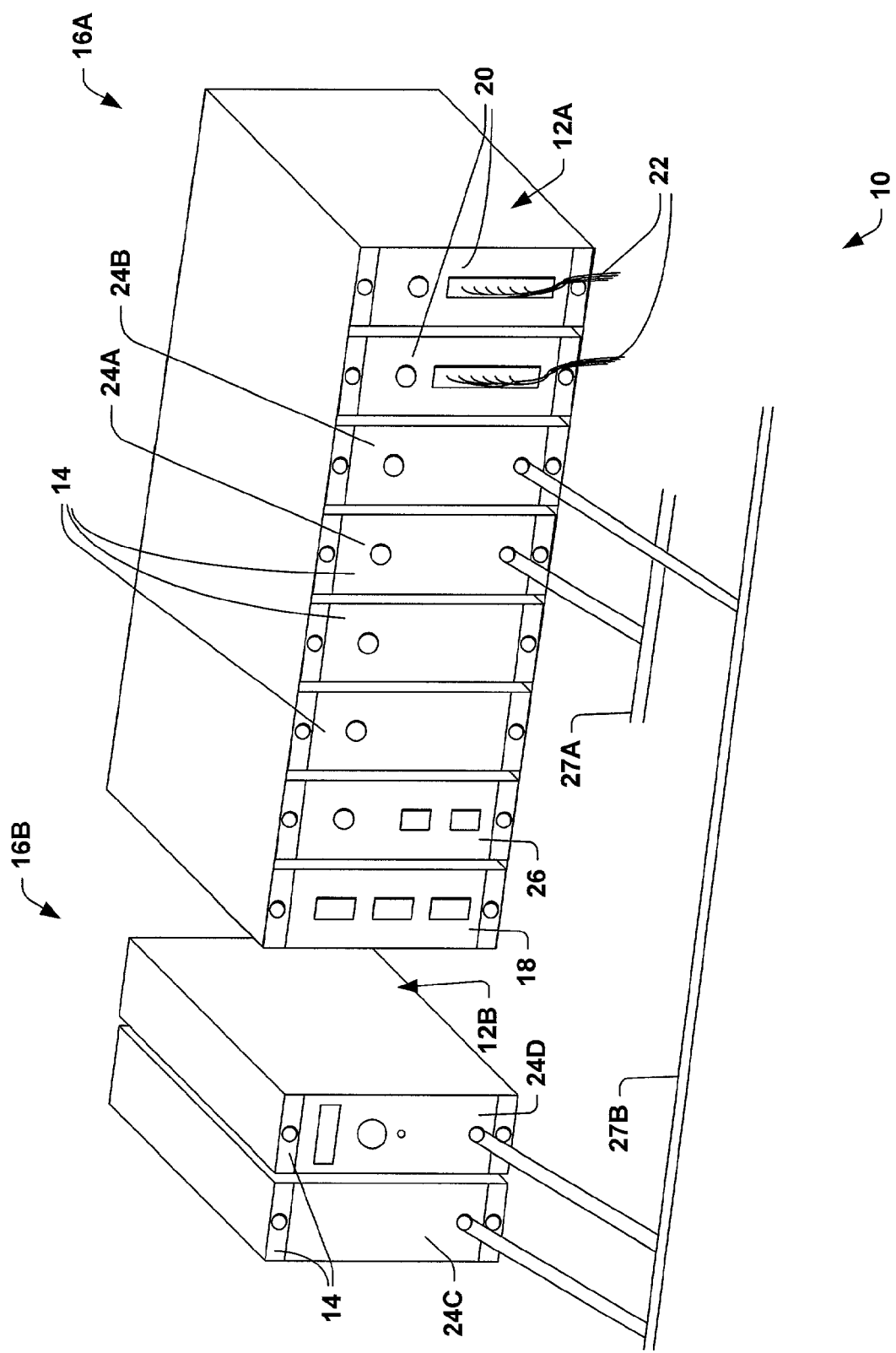
FIG. 1 is an isometric view illustrating an example of an industrial controller having multiple functional modules contained in several racks joined by communication links.

The various aspects of the present invention will now be described with reference to the drawings, wherein like reference numerals are used to refer to like elements throughout. The present invention relates to a system and method for synchronizing periodic operation of one or more modules of an industrial controller relative to a common time base. Some of the modules may be configured to operate in a mode in which they employ a sampling to initiate periodic sampling. Each module may synchronize its sampling interval based on the common time base. As a result, each such module periodically samples its inputs in synchronicity with the common time base. Moreover, by setting the sampling interval of each module to the same or a proportional value, each module may sample its inputs at substantially the same time. Advantageously, little or no additional overhead is needed to implement the synchronization.

In order to provide context for the present invention, FIG. 1 illustrates an example of distributed industrial control system 10 suitable for use with the present invention. The system 10 includes first and second racks 12A and 12B. The racks 12A and 12B hold a number of functional modules 14 electrically interconnected by backplanes 16A and 16B running along the rear of the racks. Each module 14 may be individually removed from the rack 12A or 12B, such as for repair or replacement and to allow custom configuration of the distributed system 10. When a module 14 is removed from its respective rack 12A or 12B, it is also disconnected from its respective backplane 16.

The modules 14 within the rack 12A may include, for example, a power supply module 18, a processor module 26, two communication modules 24A and 24B and two I/O modules 20. A power supply module 18 receives an external source of power (not shown) and provides regulated voltages to the other modules 14 by means of conductors on the backplane 16A.

The I/O modules 20 provide an interface between inputs from, and outputs to external equipment (not shown) via cabling 22 attached to the I/O modules 20 at terminals on their front panels. The I/O modules 20 convert input signals on the cables 22 into digital words for transmission on the backplane 16A. The I/O modules 20 also may convert other digital words from the backplane 16A to the necessary signal levels for control of equipment. A location from where inputs may be received and to where outputs sent may collectively referred to as a field side connection(s).

Each I/O module 20 further is operable to function in a Real Time Sampling (RTS) mode in which it samples its inputs at a programmable sampling interval. The sampled data is provided from the I/O module 20 at a fixed time period for use by an associated processor. The RTS mode is useful for time based functions, such as PID and totalization, which may be performed at the processor module 26. In the RTS mode, an I/O module 20 may periodically scan and update its inputs at a user defined RTS time interval.

The communication modules 24A and 24B provide a similar interface between the backplane 16A and one of two respective external high speed communication networks 27A and 27B. The high speed communication networks 27A and 27B may connect with other modules 14 or with remote racks of I/O modules 20 or the like. In the example illustrated in FIG. 1, the high speed communication network 27A connects with backplane 16A via the communication module 24A, whereas the high speed communication network 27B connects the communication module 24B with communication modules 24C and 24D in a remote rack 12B.

The processor module 26 processes information provided by the communication modules 24A and 24B and the I/O modules 20 according to a stored program and provides output information to the communication module 24 and the I/O modules 20 in response to the stored program and received input messages.

Figure 2:
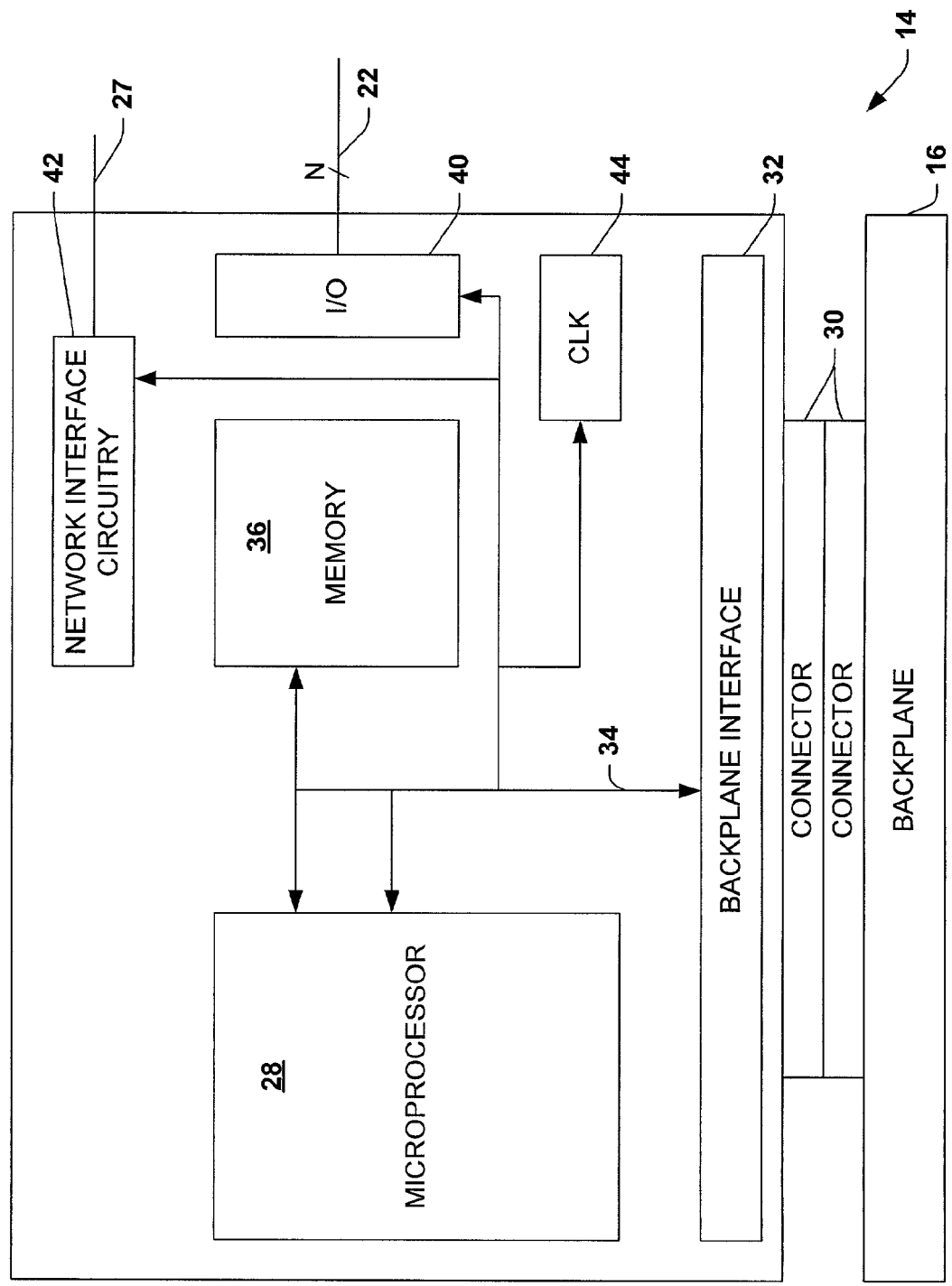
FIG. 2 is a schematic block diagram of a functional module of FIG. 1 illustrating its connection to a common backplane and communication links to communicate with other modules.

FIG. 2 illustrates an example of a functional module 14 that may be mounted within a rack 12A or 12B. The I/O module 20 is attached to the backplane 16 by means of a separable electrical connector 30 that permits the removal of the module 14 from the backplane 16 so that it may be replaced or repaired without disturbing the other modules 14. The backplane 16 provides the module 14 with both power and a communication channel to the other modules 14.

Local communication with the other modules 14 through the backplane 16 is accomplished by means of a backplane interface 32, which electrically connects to the backplane 16 through the connector 30. The backplane interface 32 monitors messages on the backplane 16 to identify those messages intended for the particular module 20, based on a message address being part of the message and indicating the message's destination. Messages received by the backplane interface 32 are conveyed to an internal bus 34 in the module 14. One particular message is a connection request message that is utilized to initially program and/or configure the module 14 with configuration data. The configuration data controls the operating characteristics of the module 14, such as its operating modes and what functions it may perform.

Another message, which may be globally sent to the module 14 via the backplane 16, is a Coordinated System Time (CST) message. The CST message is a time stamp indicative of a time value (e.g., in microseconds) relative to some arbitrary starting time. As set forth in greater detail below, the CST message is provided from a master module to provide a common time base for use by all the modules 14 in the controller system 10.

The internal bus 34 joins the backplane interface 32 with a memory 36, a microprocessor 28, I/O interface circuitry 40 (e.g., if the module is an I/O module 20) and communication network interface circuitry 42 (e.g., if the module is a communication module 24). The microprocessor 28 may be a general purpose microprocessor providing for the sequential execution of instructions contained in memory 36 and the reading and writing of data to and from the memory 36 and the other devices associated with the internal bus 34.

The microprocessor 28 includes an internal clock circuit (not shown) providing the timing of the microprocessor 28 but may also communicate with an external precision clock 44 of improved precision, which may exist in a communications ASIC. This clock 44 may be a crystal controlled oscillator or other time standard including a radio link to an NBS (National Bureau of Standards) time standard. The precision of the clock 44 is recorded in the memory 36 as a quality factor.

The memory 36 holds programs executed by the microprocessor 28 to provide desired functions and also variables and data necessary for the execution of those programs. For an I/O module 20, the memory 36 also includes an I/O table holding the current state of inputs and outputs received from and transmitted to the industrial controller 10 via the I/O modules 20. One particular parameter stored in the memory 36 is an RTS value, which indicates the sampling time interval of the module. The microprocessor 28 further may employ the RTS value to synchronize periodic sampling of its associated inputs 22 relative to the CST value.

By way of example, prior to an I/O module 20 initiating sampling, the module may delay sampling until the CST value reaches an integer multiple of its RTS value. That is, the processor 28 delays activation of the I/O circuitry 40 to sample the inputs 22 until a time when the CST value is a multiple (e.g., an integer multiple) of the RTS value. The processor 28 is provided periodic sample values from the I/O circuitry 40 at an interval set according to the RTS value. It is to be understood and appreciated that the output application also may be delayed until synchronized in a similar manner.

Figure 3:
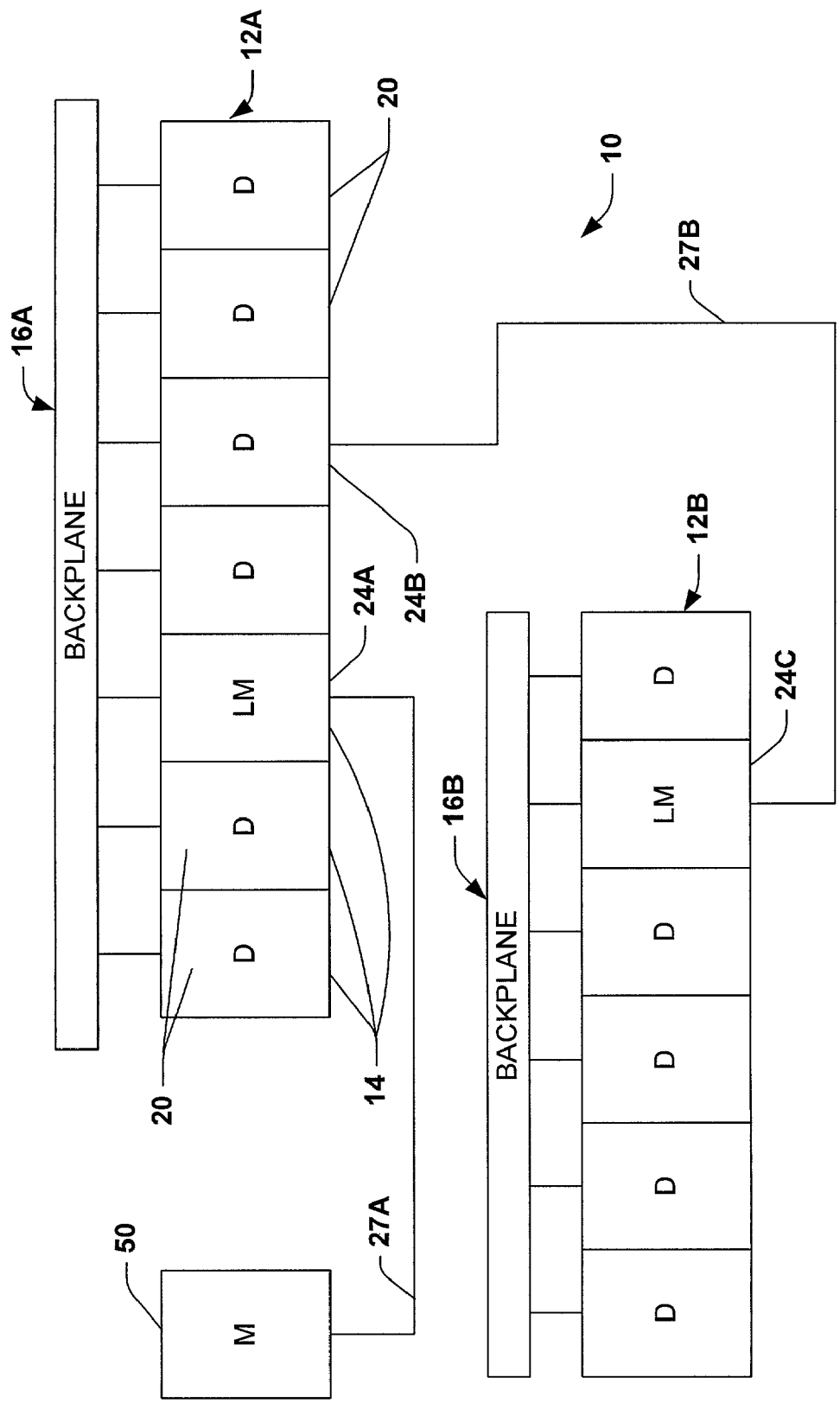
FIG. 3 is a pictorial representation illustrating various types of interlinked functional modules.

FIG. 3 is a schematic block representation of the system 10, illustrating the interconnection between the various function modules 14. For the purposes of establishing a system time (CST) common to all functional modules 14, each functional module 14 may operate in one of up to three modes: time-master, local master or dependent. A time-master module 50 in the example of FIG. 3, designated by the letter "M," operates in a time-master mode and provides the coordinated system time (CST) signal to all other functional modules 14 either directly through a high speed communication link 27A or indirectly through the agency of one or more relays.

By way of example, the CST signal is a 64 bit value representing a counted number of microseconds from an arbitrary origin in time. The CST signal indicates the time value of the next microsecond tick of the microsecond clocks of each of receiving functional modules and thus ensures that each of the receiving modules has the same count value upon receipt of the CST message. In between CST signals, the modules 14 may track the 64 bit count value (or a portion thereof) internally and employ subsequent CST messages to correct drift in this count value on a periodic basis.

A communication module 24A, designated by the letters "LM" in FIG. 3, receives the CST signal from communication link 27A and operates as a local master to forward at least part of the CST signal to a second communication channel of the backplane 16a for use by all the modules in rack 12a. A communication module 24B, in turn, receives the CST signal from the backplane 16a and retransmits it to the high speed communication link 27B. The communication module 24C receives the retransmitted CST signal. The module 24C also acts in a local master capacity to forward at least part of the CST message to backplane 16b. Generally each communication module 24 may act as a bridge between different communication links either the high speed links 27 or the backplanes 16. A communication module 24 may be a local master of one or more links, for example, of both a back-plane 16 and a high speed link 27.

In accordance with one aspect of the present invention, the complete CST signal (e.g. 64 bits) is relatively infrequent to conserve the bandwidth of the backplane 16 and the communication links 27A and 27B. The complete CST signal may be employed to obtain an initial synchronization of the system 10. Therefore the communication modules 24, when acting as local masters, may employ their internal clocks to generate a more frequent resynchronizing signal (e.g., a 16 bit signal) for the other modules 14 on the backplane 16. The resynchronizing signal may have a value indicative of the CST value or indicative of incremental changes from the last received CST value. For example, the complete CST signal may be a message transmitted infrequently, whereas the communication modules 24 acting as a local master may transmit on the backplane 16 a resynchronizing signal once every several microseconds based on their internal clocks updated from the CST signal. Thus modules 14, which may not have clocks sufficiently accurate to provide the correct time value count in between updates from the CST value, may be provided with more frequent updates derived from the synchronized clock of the local master communication module 24.

The remaining modules 14 operate in a dependent mode, designated by the letter "D", in which they receive either the CST signal or a higher resolution resynchronizing signal keyed to the CST signal for use in carrying out instructions, including synchronization in accordance with an aspect of the present invention. All modules 14 may operate in a dependent mode; however, only certain modules may operate in local master or time-master modes.

One type of dependent module is an I/O module 20, which may be programmed and/or configured to operate in a synchronization mode in accordance with an aspect of the present invention. As mentioned above, the I/O module 20 may delay its initial sampling to synchronize periodic sampling relative to the CST signal (e.g., initiate sampling when the CST value is an integer multiple of the RTS value). Moreover, the I/O module 20 may subsequently resynchronize its sampling operation, such as upon determining that the sampling time interval has drifted relative to the CST by more than a predetermined calibration limit. If the sampling drifts outside calibration limits, the module 20 may periodically resynchronize its sampling, such as based on either the resynchronizing signal or the CST signal. The resynchronization process may occur in substantially the same manner as the initial synchronization, namely, by delaying initiation of further sampling until a time when either the resynchronizing signal or the CST signal has a value that is a multiple of the module's RTS value.

Figure 4:
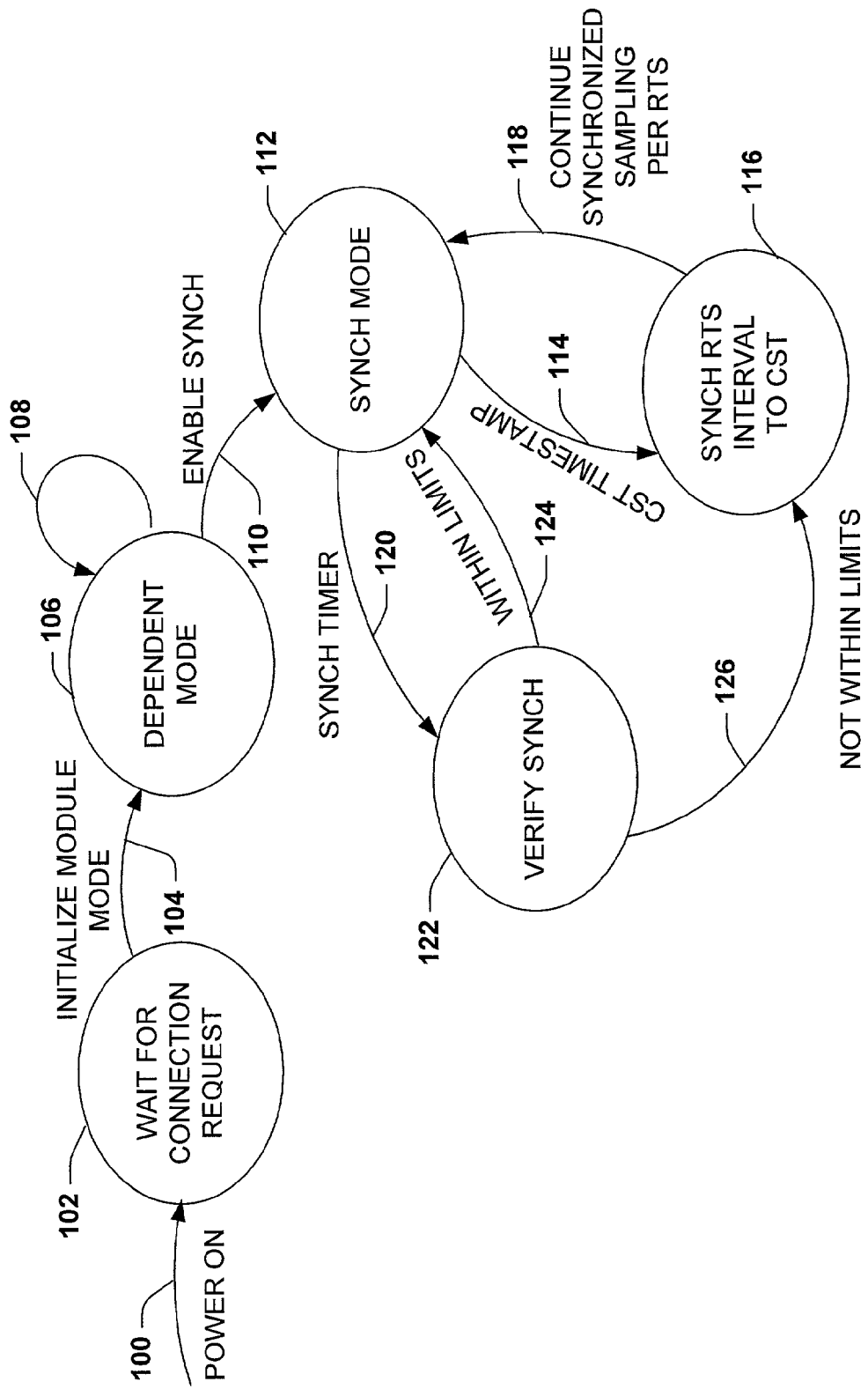
FIG. 4 is a state diagram illustrating a methodology for synchronizing a module in accordance with the present invention.

FIG. 4 is an example of a state diagram illustrating operating characteristics (or states) of a functional module programmed and/or configured to primarily operate as an I/O module in accordance with an aspect of the present invention.

After the module is connected to the backplane and first receives power (POWER ON), as indicated by state change arrow 100, the module enters a state 102 where it waits for a valid connection request message via the backplane or control network. The module utilizes data contained in the connection request message to control and/or program the operating characteristics of the module. The configuration data may be stored in memory at the module. The connection request message includes data indicating whether the module is to be a local master module or a dependent module. In this example, as represented by state change arrow 104, it is assumed that the configuration data indicates that the module is to operate as a dependent I/O module. The module thus enters the dependent mode 106.

In accordance with an aspect of the present invention, a dependent I/O module may have two or more operating modes for controlling sampling of its inputs. The operating modes may be user configurable, such as by setting an appropriate configuration data (e.g., one or more bits), which may be provided with the connection request message. If the configuration data is set to a first condition, the module remains in a normal dependent mode 106, as indicated by state change arrow 108. In this mode, the module operates in response to command requests received via the backplane and samples its inputs according to the RTS value provided with the connection request message. However, such sampling may not be synchronized with any external clocking feature.

Alternatively, as represented by state change arrow 110, if the configuration data is set to a second (different) condition, the module enters in a synchronization mode 112. In the synchronization mode 112, the periodic sampling interval (RTS) of the module synchronizes with the CST value, such as may be provided as a CST message by a master module over the backplane.

As represented by state change arrow 114, the module receives the CST signal via the backplane or control network. The module initially enters a synchronization state 116 in response to receiving the CST value in which the sampling interval RTS synchronized with the CST. That is, instead of initiating sampling according to its RTS value immediately upon entering the dependent mode, the module delays initiating its first sample until a subsequent time calculated based on the CST value. The module is programmed and/or configured to synchronize to a specific time calculated as a multiple of the module's RTS value. That is, the module sets an internal clock according to the received CST value and delays sampling until the internally kept CST reaches an integer multiple of its RTS value. Alternatively, the module may initiate sampling when a local synchronization message from a local master module has a value that reaches a multiple of the RTS value.

By way of example, if the RTS time interval is 100 milliseconds and the current CST value is 108,699 microseconds, the module delays sampling until a CST value of 200,000 microseconds (which is two-times the RTS time value). Advantageously, if a subsequent module is connected to the same backplane and configured to employ the same RTS time (100 milliseconds), the subsequent module, in accordance with an aspect of the present invention, will automatically synchronize to substantially the same sample rate by employing the same procedure (e.g., delay sampling until X*100,000 microseconds, where X is an integer).

After the delay is implemented to establish synchronization to the CST value, the module returns to the synchronization mode 112 via state change arrow 118, in which sampling resumes at an interval according to its RTS value. While in the synchronization mode 112, the module may have a timer routine running in the background that is employed to trigger a verification process to determine whether the sampling is still adequately synchronized with the CST. When the timer expires, as represented by state change arrow 120, the module enters state 122 to verify accurate synchronization to the CST. The verification is employed to mitigate excessive drift in sampling intervals between synchronized modules. By way of example, the verification may be determined by comparing the sampling time with the CST value and determining whether the time values are within a calibration limit (e.g., tolerance). The calibration limit may be a fixed value or it may vary as a function of the RTS value. If the calibration limit varies based on the RTS value, for example, a module that employs a smaller RTS value may have a tighter calibration limit than a module having a larger RTS value.

If the sampling time and the CST are within calibration limits, the verification timer is reset and the module returns to the synchronization mode 112 via state change arrow 124. If the difference between the sampling time and the CST, however, exceeds a predetermined calibration limit, the module reenters state 116 via state change arrow 126. In state 116, the module resynchronizes its sampling time by delaying its next sampling until the CST value once again is a multiple of the RTS value. The verification timer is reset and sampling continues, with the module returning (via state change arrow 118) to the synchronization mode 112. The module continues sampling based on the RTS value, which remains synchronized to the CST within calibration limits.

Figure 5:
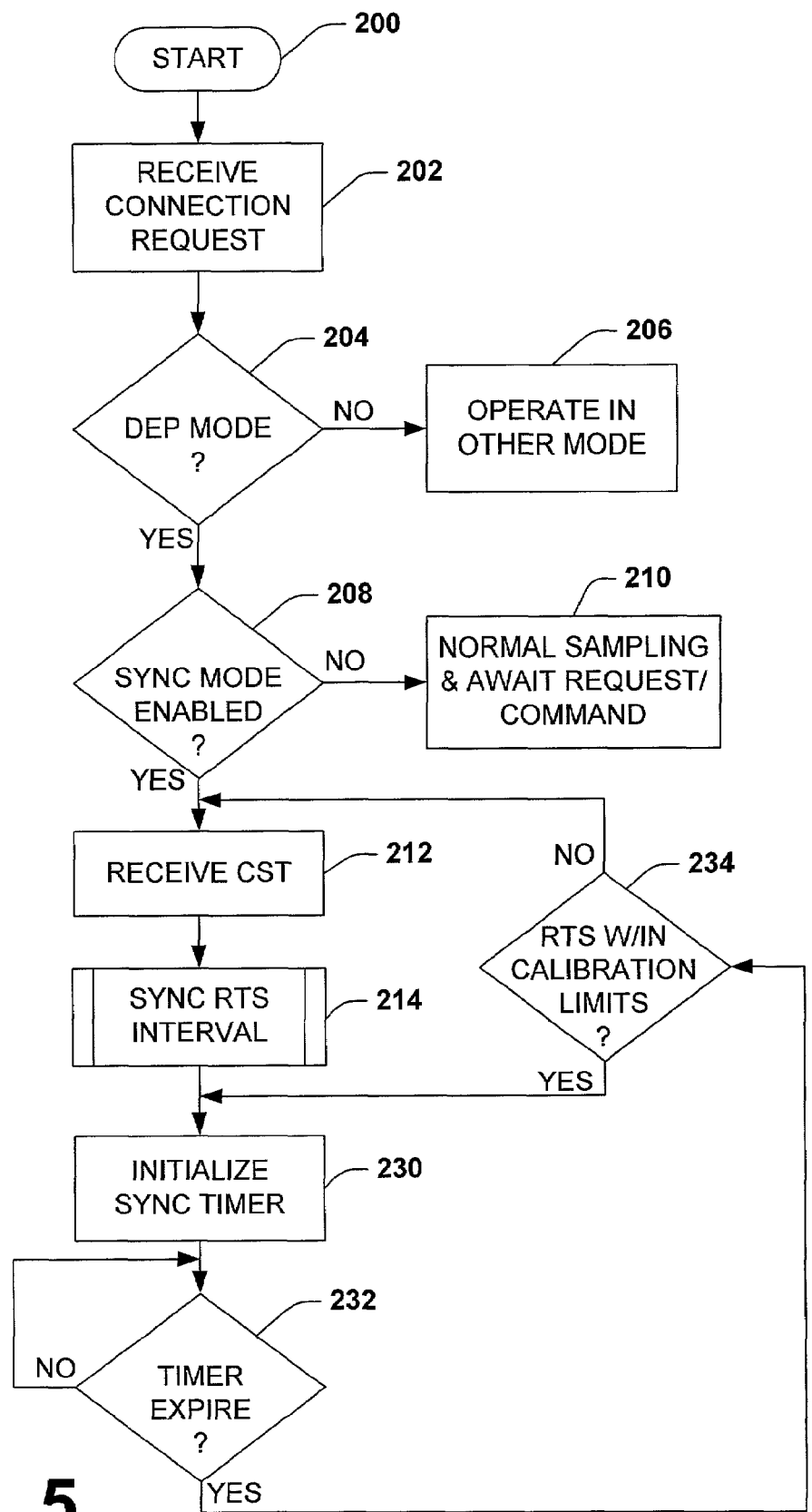
FIG. 5 is a flow diagram illustrating a methodology for configuring a module in accordance with the present invention.

FIG. 5 is a flow diagram illustrating an example of a methodology for controlling and/or configuring operation of a functional module in accordance with an aspect of the present invention. The methodology begins at step 200, such as by connecting the module to the backplane, in which power is provided to the module. From step 200, the process proceeds to step 202. At step 202, the module receives a connection request message, which contains configuration information for programming and/or configuring operating characteristics of the particular module.

Next, at step 204, a determination is made as to whether the module is operating in the dependent mode as an I/O module. If the determination is negative, the process proceeds to step 206 and the module operates in a different mode(s) according to the configuration information, such as described above. If the determination is affirmative, the process proceeds to step 208.

At step 208, a determination is made as to whether the synchronization mode is enabled. If the synchronization mode is not enabled, the process proceeds to step 210. At step 210, the module may immediately begin sampling at a sampling interval (RTS), which may be a default value or a user selected value provided with its connection request message. Also at step 210, the module may receive other requests for executing a control command(s). Details concerning such operation of the module are well known to those skilled in the art and have been omitted for sake of brevity.

If the determination at step 208 is affirmative, the process proceeds to step 212. At step 212, the module receives a CST message via the backplane/network. As mentioned above, the CST message is a timestamp value, which may be in microseconds, provided by a master module of the controller system. From step 212, the process proceeds to step 214, in which the RTS interval is synchronized relative to the CST by a synchronization process.

Figure 6:
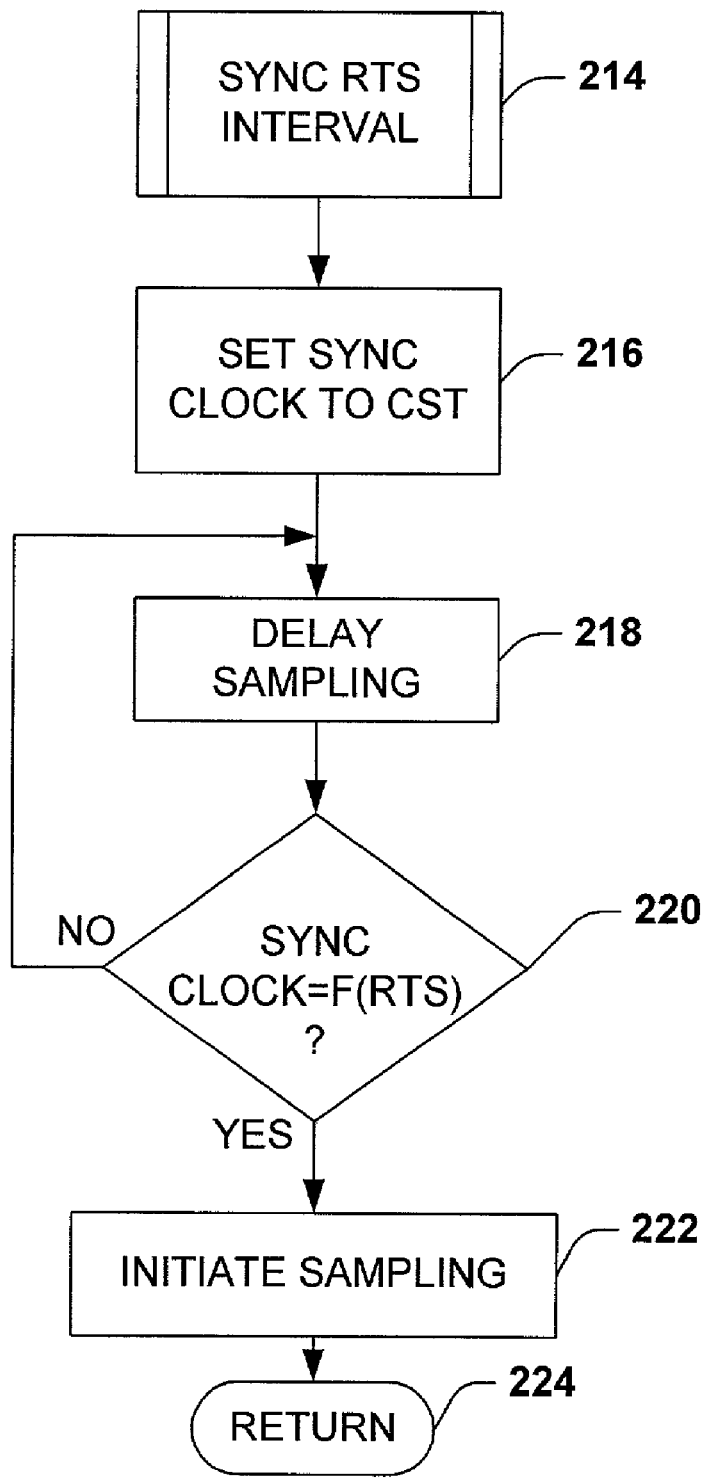
FIG. 6 is a flow diagram illustrating an exemplary methodology for synchronizing a module in accordance with the present invention.

FIG. 6 illustrates an exemplary methodology for the synchronization process in accordance with an aspect of the present invention. The process is entered at step 214 (FIG. 5) and then proceeds to step 216 in which an internal synchronization clock (or timer) is set according to the CST received at step 212. Alternatively, a synchronization clock value may be received via the backplane (or control network), such as in a synchronization message from a local master module. Next, at step 218, initiation of sampling the module inputs is delayed. The process proceeds to step 220.

At step 220 a determination is made as to whether the internal synchronization clock (or a local synchronization message) has a value functionally related to the RTS value. In particular, step 220 may determine when the internal synchronization clock (or a local synchronization message) has a time value that is multiple of the RTS interval value. If the determination is negative, the process returns to step 218 in which the sampling is further delayed. When the internal synchronization clock (or a local synchronization message) reaches a time value that is a multiple of the RTS value, the process proceeds to step 222. At step 222, the module initiates sampling of its inputs. As a result, subsequent sampling occurs periodically based on the RTS interval value. Provided that the internal clock of the module remains in sync with the CST, each subsequent sampling interval may occur at a CST that is a multiple of the RTS value. From step 222, the process proceeds to step 224, in which the process returns to step 230 of FIG. 5.

Referring back to FIG. 5, a resynchronization timer is initialized at step 230. The resynchronization timer provides a mechanism for triggering resynchronization of the sampling interval relative to the CST when the sampling time interval become out of synchronization with the CST. From step 230, the process proceeds to step 232.

At step 232, a determination is made as to whether the resynchronization timer has expired. If the timer has not expired, the process returns to step 232 in which sampling may continue as described herein. If the timer has expired, the process proceeds to step 234. At step 234, a determination is made as to whether the RTS sampling time has drifted outside of a predetermined calibration limit relative to the CST (e.g., based on an internal sync clock or a local synchronization (CST) message received via the backplane). The calibration limit may be a fixed time value or, alternatively, the calibration limit may vary as a function of the RTS value of the module. If the determination at step 234 is affirmative, indicating that the RTS value is within calibration limits, the process loops back to step 230 where the resynchronization timer is reinitialized and sampling may continue as described herein. If the determination at step 234 is negative, indicating that the sampling time interval has drifted too much relative to the CST, the process proceeds to step 212 in which the next CST message is received and a resynchronization process (step 214) is implemented. The process may continue in this manner indefinitely until the module is either reconfigured or deactivated.

Advantageously, the methodology described herein may be implemented with little or no additional overhead other than perhaps configuration data, which may be employed to selectively enable or disable the synchronization process at a module. Moreover, a plurality of modules connected to a backplane may automatically synchronize activation of their sampling intervals and/or application of output data relative to a common time base. As a result, modules having the same sampling interval (RTS) may sample their inputs at substantially the same time. If modules are configured to have evenly divisible sampling intervals, the synchronized modules will initiate at least some samples in synchronization. For example, a first module may sample every 25 milliseconds and a second module every 100 milliseconds. Consequently, after the modules are synchronized, every fourth sample interval of the first module, in accordance with an aspect of the present invention, is synchronized with each sample of the second module.

Although the invention has been shown and described with respect to a certain illustrated implementations, it will be appreciated that equivalent alterations and modifications will occur to others skilled in the art upon the reading and understanding of this specification and the annexed drawings. In particular regard to the various functions performed by the above described components (assemblies, devices, circuits, systems, etc.), the terms (including a reference to a "means") used to describe such components are intended to correspond, unless otherwise indicated, to any component which performs the specified function of the described component (i.e., that is functionally equivalent), even though not structurally equivalent to the disclosed structure, which performs the function in the herein illustrated exemplary implementations of the invention.

In addition, while a particular feature of the invention may have been disclosed with respect to only one of several illustrated implementations, such feature may be combined with one or more other features of the other embodiments as may be desired and advantageous for any given or particular application. Furthermore, to the extent that the terms "includes", "including", "has", "having", and variants thereof are used in either the detailed description or the claims, these terms are intended to be inclusive in a manner similar to the term "comprising."

What is claimed is:

1. A system for synchronizing a sampling interval at an industrial control module comprising:
   a controller for providing to a communications link a coordinated system time base signal having a value indicative of a coordinated system time; and
   a module operatively connected to the communications link, the module having an activation interval for controlling periodic activation relative to at least one of an input and an output thereof;
   wherein the module is programmed to synchronize the activation interval thereof relative to the coordinated system time base value by delaying activation at the module until the coordinated system time is an integer multiple of the activation interval.

2. The system of claim 1, wherein the activation interval corresponds to a sampling interval for controlling periodic sampling of at least one input of the module.

3. The system of claim 1, wherein the activation interval corresponds to application interval for controlling periodic application of at least one output of the module.

4. The system of claim 1, wherein the communications link includes at least one of a backplane and a network infrastructure.

5. The system of claim 1 further including a plurality of spatially separated modules operatively connected to the communications link, each of the modules having an activation interval for controlling at least one of periodic sampling of at least one input thereof and periodic applying of data to at least one output, each module synchronizing the activation interval thereof relative to the coordinated system time base value so that the activation interval of each module is coordinated with respect to a common time base.

6. The system of claim 1, wherein the activation interval is user-configurable.

7. The system of claim 1, wherein the module is further programmable to disable synchronized activation thereof, when synchronized activation is disabled, the module initiating periodic activation relative to at least one of an input and an output thereof sampling arbitrarily.

8. The system of claim 1, wherein the module is further programmed to periodically resynchronize the activation interval thereof relative to the coordinated system time base value.

9. The system of claim 8, wherein the resynchronization occurs in response to determining that the periodic activation is occurring at a time relative to the coordinated system time base that is outside of an expected range.

10. The system of claim 9, wherein the resynchronization occurs by delaying subsequent activation at the module until coordinated system time is a multiple of the activation interval at the module.

11. A module for use in an industrial controller system comprising:
   a communications link for receiving a coordinated system time base signal having a value indicative of a coordinated system time; and
   a field side for at least one of sampling input data and applying output data;
   wherein the module is programmed to control activation of the field side based on an activation interval value, the module synchronizing the activation interval for the field side relative to the coordinated system time base value by delaying activation of the field side until the coordinated system time has a value that is an integer multiple of the activation interval.

12. The system of claim 11, wherein the activation interval value is a predetermined user-configurable value.

13. The system of claim 11, wherein the field side includes an input, the activation interval defining a sampling interval for the input.

14. The system of claim 11, wherein the field side includes an output, the activation interval defining an application interval for applying data to the output.

15. A system for providing synchronized sampling at an industrial control module comprising:
   means for receiving a coordinated system time base signal at the module having a value indicative of a coordinated system time; and
   means for synchronizing an activation interval of the module relative to the coordinated system time base value by delaying activation at the module until the coordinated system time is an integer multiple of the activation interval.

16. A method for synchronizing sampling of a module relative to a common time base, the module having an interval for controlling periodic activation relative to at least one of an input and an output thereof, the method comprising the steps of:
   receiving a coordinated system time base signal having a value indicative of a coordinated system time; and
   synchronizing the activation interval of the module relative to the coordinated system time base value by delaying activation at the module until the coordinated system time is an integer multiple of the activation interval.

17. The method of claim 16, wherein a plurality of modules receive the coordinated system time base signal and synchronize periodic activation thereof relative to the coordinated system time base value so that the periodic activation at each module is coordinated relative to the common time base.

18. The method of claim 16 further including programming the activation interval with a user-selected value.

19. The method of claim 16 further including programming the module to enable or disable the step of synchronizing.

20. The method of claim 16 further including periodically resynchronizing the activation of the module relative to the coordinated system time.

21. The method of claim 20, wherein the resynchronization occurs in response to determining that the periodic activation is occurring at a time relative to the coordinated system time that is outside of an accepted range.

22. The method of claim 21, wherein the step of resynchronizing further includes delaying subsequent activation at the module until the coordinated system time is a multiple of the sampling interval.

23. The method of claim 16, wherein the activation interval is a sampling interval for controlling periodic sampling of at least one input of the module.

24. The method of claim 16, wherein the activation interval is an application interval for control periodic applying of data to at least one output of the module.

* * * * *